United States Patent
Beiser et al.

(10) Patent No.: US 9,251,512 B2
(45) Date of Patent: Feb. 2, 2016

(54) METHOD AND APPARATUS FOR IDENTIFICATION VERIFICATION AND PURCHASE VALIDATION

(75) Inventors: Joseph Carl Beiser, Northville, MI (US); Michael Raymond Westra, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 737 days.

(21) Appl. No.: 13/429,707

(22) Filed: Mar. 26, 2012

(65) Prior Publication Data

US 2013/0254109 A1  Sep. 26, 2013

(51) Int. Cl.
*G06Q 20/32* (2012.01)
*G06Q 20/08* (2012.01)
*G06Q 20/40* (2012.01)
*G06Q 20/24* (2012.01)

(52) U.S. Cl.
CPC ............. *G06Q 20/08* (2013.01); *G06Q 20/24* (2013.01); *G06Q 20/32* (2013.01); *G06Q 20/3224* (2013.01); *G06Q 20/40* (2013.01)

(58) Field of Classification Search
None
See application file for complete search history.

(56) References Cited

U.S. PATENT DOCUMENTS

| | | | |
|---|---|---|---|
| 7,379,897 B2 | 5/2008 | Pinkus | |
| 7,565,307 B1 | 7/2009 | Pinkus | |
| 2004/0066273 A1* | 4/2004 | Cortina et al. | 340/5.1 |
| 2009/0049119 A1* | 2/2009 | Marcinkiewicz | H04L 67/28 709/203 |
| 2010/0114734 A1* | 5/2010 | Giuli | G06Q 20/12 705/26.1 |
| 2013/0080225 A1* | 3/2013 | Rajaram | 705/14.16 |

* cited by examiner

*Primary Examiner* — Calvin L Hewitt, II
*Assistant Examiner* — Isidora Iluonakhamhe
(74) *Attorney, Agent, or Firm* — Jennifer M. Stec; Brooks Kushman P.C.

(57) ABSTRACT

A computer implemented method includes receiving a request for payment-related information at a wireless device. The method also includes communicating between the wireless device and a paired vehicle computing system (VCS) to verify the presence of a known vehicle. Further, the method includes transmitting requested payment-related information, responsive to the verification of the presence of the known vehicle.

7 Claims, 3 Drawing Sheets

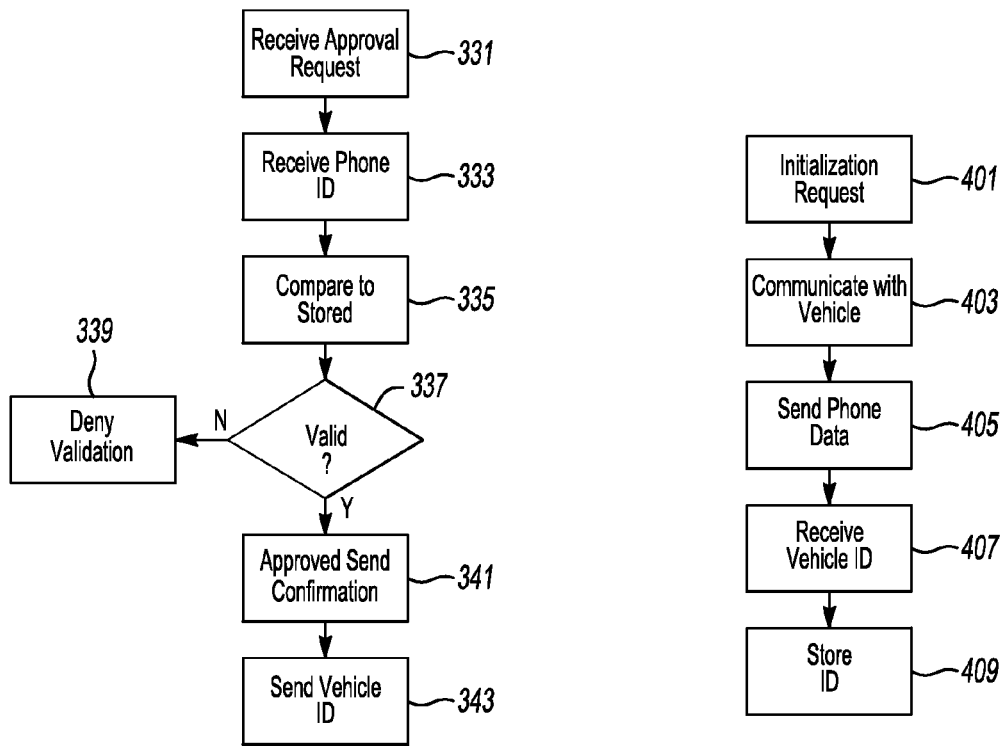
Fig-3B
Fig-4A
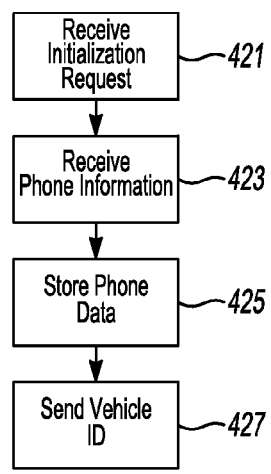
Fig-4B

METHOD AND APPARATUS FOR IDENTIFICATION VERIFICATION AND PURCHASE VALIDATION

TECHNICAL FIELD

The illustrative embodiments generally relate to a method and apparatus for identification validation and purchase verification.

BACKGROUND

Wireless technology, vehicle based computing systems, portable phones and computers, biometric IDs, RFID chips storing "cash"—among other things, modern technology is all about portability and convenience. The internet can be accessed almost anywhere, at the touch of a button, in seconds. Purchases can be made online, with the swipe of a card, and sometimes using a chip in a portable device. While all of these innovations certainly make our lives easier, the level of access to an individual's entire life that can be obtained through the theft of one or more implements of convenience can sometimes give cause for alarm. Fortunately, this risk is not unrecognized, and the providers of technological convenience are always striving to provide increased security to accompany modern systems.

Cellular phones can hold an ever increasing amount of personal and financial data. Applications allow access to bank accounts, credit card accounts, and some phones even have chips that store cash amounts for purchases. Unfortunately, due to the fact that most phones are used so often, they are highly susceptible to loss, when a user misplaces or forgets a phone at a location of use. Similarly, phones may make desirable targets for theft, as they are small, portable, and provide potentially expansive access to a person's personal data.

SUMMARY

In a first illustrative embodiment, a computer implemented method includes receiving a request for payment-related information at a wireless device. The method also includes communicating between the wireless device and a paired vehicle computing system (VCS) to verify the presence of a known vehicle. Further, the method includes transmitting requested payment-related information, responsive to the verification of the presence of the known vehicle.

In a second illustrative embodiment, a computer implemented method includes receiving a validation request at a vehicle computing system (VCS) from a paired wireless device. The method also includes receiving device identifying information from the wireless device. Further, the method includes validating an identity of the wireless device. The method also includes transmitting vehicle identifying information to the wireless device, responsive to validation of the identity of the wireless device.

In a third illustrative embodiment, a computer readable storage medium stores instructions that, when executed by a processor, cause the processor to perform a method including receiving a request for payment-related information at a wireless device. The method also includes communicating between the wireless device and a paired vehicle computing system (VCS) to verify the presence of a known vehicle. Also, the method includes transmitting requested payment-related information, responsive to the verification of the presence of the known vehicle.

BRIEF DESCRIPTION OF THE DRAWINGS

FIG. 3B shows an illustrative example of yet another verification process;
FIG. 4A shows an illustrative example of a verification configuration process;
and
FIG. 4B shows an illustrative example of a second verification configuration process.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
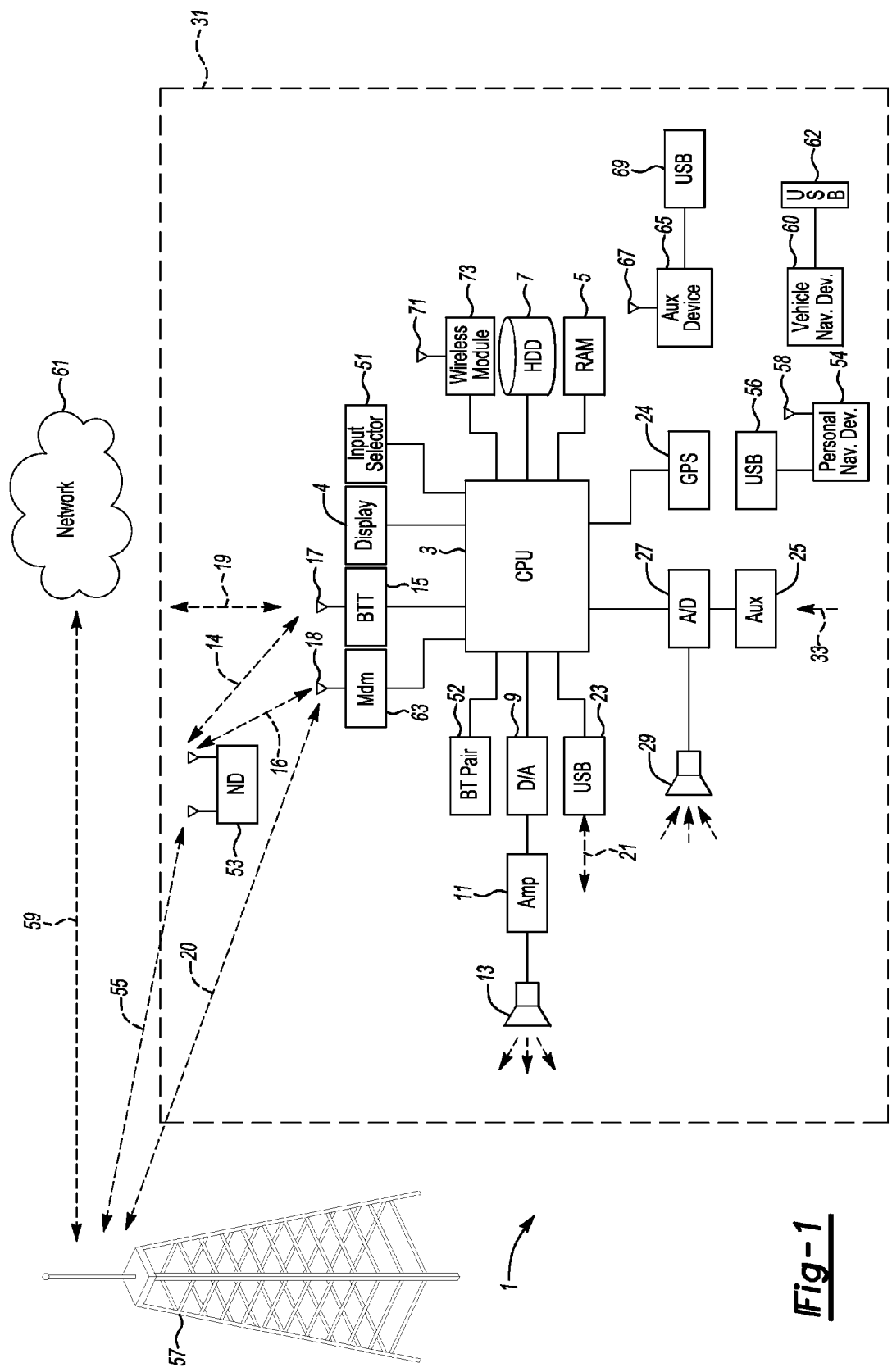
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively. WiFi devices can also be used, for example, over a local area Ethernet connection.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed. WiFi can also be used to pass data in, for example, a peer to peer manner.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Various means of further identification are often present when using other-than-cash means of purchasing goods. For example, when using a credit card, fuel pumps often require that a user input a zip code, or possibly a pin number, if the purchase is made with a debit card. Places of business that accept checks usually require the user to provide additional verification as well, such as a photo ID which can verify that the purchaser owns the checking account.

Even when using credit cards on the internet, vendors typically require the input of a three digit code from the back of the credit card, to ensure that a card number has not been simply written down or otherwise stolen from the front of a card.

For a variety of reasons, however, this may add a degree of inconvenience in certain situations. While some of the situational examples presented herein may seem to be fringe occurrences, many of them may become more common as further advances in purchasing technology are made.

For example, in one instance, a user may elect to purchase a good using a wireless phone. The purchase could be made using an account saved with the phone, and linked to a bank or credit line account. To ensure that the purchase is not being made using a stolen phone, the vendor may require secondary authentication, such as a pin number, password, CID number, etc. These numbers, however, may be inconvenient to input. Given the multitasking capabilities of phones, along with BLUETOOTH and other wireless connectivity, it is not unreasonable to posit a scenario wherein a phone wirelessly connects to a local device for purposes of making a purchase, using, for example, a purchasing application or other software/hardware installed on the phone. At the same time, the user may be talking on the phone, texting, surfing the Internet, etc. Requiring the user to input secondary identification may interrupt the ongoing communication session.

While the interruption may be brief, it can also be avoided in certain situations wherein secondary identification other than user input identification is possible. For example, it is reasonable to assume that a person driving their own (or a family) vehicle, and also in possession of their own (or a family) phone, is probably either an account holder or authorized to use an account, especially for (but not limited to) purchases of goods such as gasoline. The illustrative embodiments propose non-limiting examples of how communication between the phone and a vehicle, additionally or alternatively including phone/vehicle identification, can be used as a "background" means of secondary identification, removing the need for explicit input of identification.

This could be useful in a variety of scenarios, and, while largely a matter of increased convenience, can even provide increased security, as the odds of an unauthorized party being in possession of both a stolen phone and a vehicle are reasonably low.

Figure 2A:
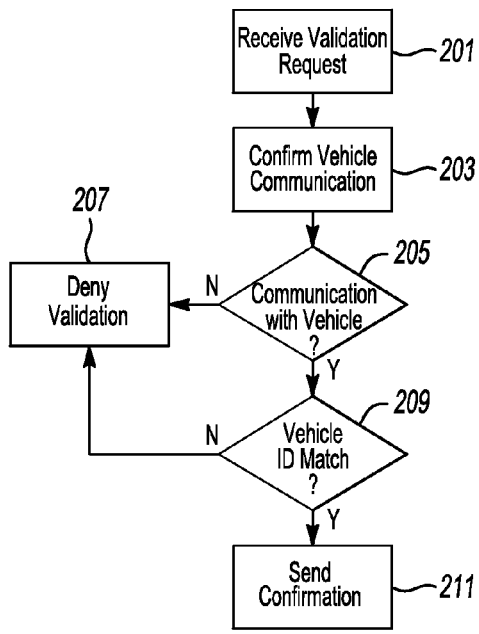
FIG. 2A shows an illustrative example of a verification front-end process.

FIG. 2A shows an illustrative example of a verification process. In this illustrative example, the process receives a validation request 201. In this example, the authentication front-end process is a secondary application/firmware running on the wireless device. It could also be integrated into any reasonable point along the communication line. For example, the process could be integrated into a fuel pump with a wireless transceiver, be part of a secondary application created to interact with various wireless devices, be running on an on-board vehicle computing system, etc.

In this example, once the request is received, the process checks to see if the wireless device is in communication with a vehicle computing system 203. This establishes that the device is at least capable of providing some form of vehicle-based communication. In other instances, not shown, an application running on the pump could ask for communication verification, both from a wireless device and a vehicle, or the pump could communicate directly with a vehicle and ask for verification that a wireless device was connected, etc.

If communication is not present, the process will fail 207, and validation will not be achieved. In such an instance, a secondary validation could be used (e.g., without limitation, a PIN, zip code, password, etc.). If there is communication with the vehicle, in this process, the system may check to see if a vehicle ID (transferable from the vehicle computing system to the wireless device, for example) matches a vehicle ID stored on the wireless device at a previous point, when the purchasing schema was initiated. This could help prevent a situation where authorization was obtained simply based on a pairing between the wireless device an any non-authorized vehicle. Similarly, if the application were running on a fuel pump, the pump could query the phone for a stored ID, and then query the vehicle for an ID, and compare the two IDs, resulting in a validation/rejection situation depending on the results of the comparison.

In this example, once the IDs have been compared and a match has been established, the process validates the purchase 211. This could include, but is not limited to, transmitting purchasing information (card number, account number, etc.), a validation code for use in validating purchasing information, etc.

This system could additionally be used, for example, as a robust means of validating a credit card purchase. The user could swipe a card, and a process could establish communication with a wireless device, a vehicle, or both. Identification of the wireless device and vehicle (and communication therebetween if desired) could serve as a more secure means of identification of a user than simply, for example, input of a zip code. If a phone and wallet were stolen, a card and zip code would be easily obtainable (from, for example, a driver's license). But the thief would also need to possess the vehicle, in this example, in order to use the card.

While the proposed exemplary embodiment relates to short range communication, if long range communication were established between a wireless device and a vehicle, the process could even be used to validate a card purchase or device based purchase within a merchant's place of business (as opposed to being proximate to the purchase point, such as a fuel pump).

Figure 2B:
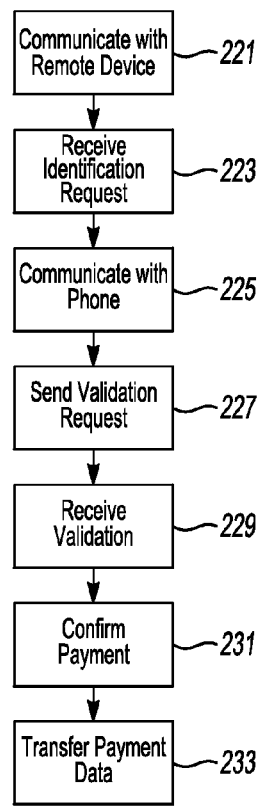
FIG. 2B shows an illustrative example of a second verification process.

FIG. 2B shows an illustrative example of a second verification process. In this illustrative example, the illustrative process shown again can be operated in a suitable medium, in this case, on a vehicle computing system (VCS), equipped with, for example, wireless communication technology. The VCS communicates with a remote device, such as, but not limited to, a fuel pump equipped with a transceiver 221. As a result of this communication, a request for payment information/validation is received from the remote device 223.

The VCS then communicates with a user wireless device, such as, but not limited to a cellular phone 225. A validation request is sent to the wireless device 227, including any necessary information accompanying the request (such as a code, or other suitable information, that may verify the ID of the vehicle to the wireless device). The wireless device can validate the vehicle as being both approved for communication with the wireless device, and as being the match to any cross-check information exchangeable between the two computing systems. A validation and any additional wireless device verification can be sent back to the VCS 229.

After any internal checks (such as locally verifying the identification and approval rights of the wireless device), the VCS can send a remote confirmation of payment to the merchant device 231. Additionally, the VCS can then transfer data, such as payment type, account ID, etc. to the merchant

233 along with the verification. Additional information can include, but is not limited to, location (GPS), time, date, etc.

In at least one embodiment, an even greater level of security can be achieved by storing account numbers on the one of the two systems (wireless device, VCS) that does not communicate with the remote merchant system, and using the other of the two systems for communication. In this scenario, the payment request is processed through the communicating system, but can only be successful after verification by the non-communicating system and relay of the account information stored thereon, through the communicating system. This could help avoid "forcing" the account information from being transferred when only a single device is present, either by spoofing a second device ID or other hack to the device.

Figure 3A:
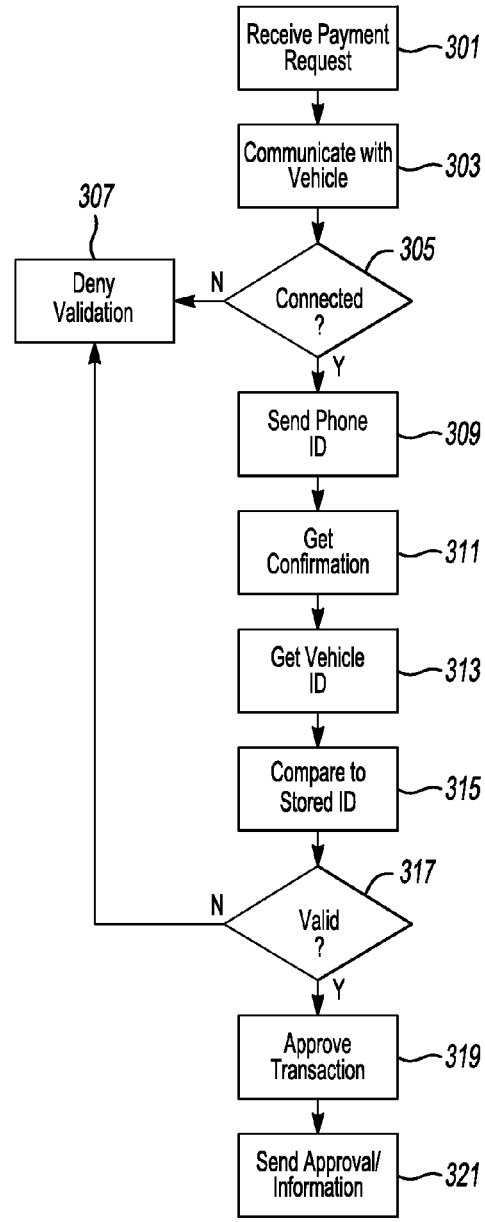
FIG. 3A shows an illustrative example of another verification process.

FIG. 3A shows an illustrative example of yet another verification process. In this illustrative example, the process executing system (for example, without limitation, a wireless device) receives a payment request 301. As previously noted, the request could be from a merchant system, another application running on the wireless device or in communication with the wireless device, etc.

After the request is received, the wireless device running the verification process communicates with the vehicle computing system 303. If a connection to the VCS does not exist, the process denies validation 307, as validation in this case is not possible without communication. In alternative embodiments, the process could request establishment of communication, provide input for secondary verification (PIN, password, etc.), etc.

If communication between the wireless device and the VCS exists, the wireless device sends an identifying characteristic of the wireless device to the VCS 309. This bi-directional identification of both systems can provide an additional level of security, if desired. Responsive to a request for verification and the sending of a phone ID (e.g., without limitation, mobile ID number (MIN), processor ID, user ID, electronic serial number (ESN), etc.), the device receives a confirmation from the VCS 311, which, in this case, includes a vehicle identification (e.g., without limitation, user ID, account ID, VIN, ESN, etc.). The wireless device can then verify not only that the vehicle approved the transaction (a process which alone, in this case, could possibly be spoofed), but can also verify the identity of the vehicle based on received information compared to information stored on a wireless device 315.

If all validations and/or comparisons are correct 317, the process can then send an approval for the transaction 319 to the merchant device. Additionally or alternatively, account information for making the purchase can be sent (or other suitable payment information, such as a smart transfer of stored funds).

In the above system, all verification is done between the wireless device and the vehicle computing system. Verification information, such as identification information, does not need to be sent to the merchant device, but rather, once the verification is complete, account information and/or validation approval can be sent to the merchant device. In at least one example, private key encryption strategies can be implemented between the wireless device and the vehicle computing system, such that no transmission of translatable, interceptable data need occur. For example, if the above process was used to verify the swipe of a credit card, the card data would be physically transferred from the swipe, and an approval code may come from the wireless device. Since the wireless device and the VCS could have set up a private key session at some previous point, when the system was initialized, a party seeking to intercept transmission would get neither account information nor legible validation information. Other suitable encryption strategies can also be implemented between the three systems (merchant, wireless device, VCS) to encrypt data, such as, but not limited to, public/private key encryption.

FIG. 3B shows an illustrative example of yet another verification process. In this illustrative example, a VCS receives an approval request from a wireless device 331, which may be in communication with a merchant system. In conjunction with the request, the VCS also receives a wireless device ID 333, usable for verifying the wireless device is a valid device. The wireless device ID can be compared by the VCS to a stored device ID, to validate the identity of the requesting device. If the device is invalid (e.g., a non-authorized device is requesting validation), the process can simply deny validation 339.

If the device ID is a valid ID, the process can approve the device as being a valid requesting device and send a confirmation to the device 341. In addition to sending the confirmation to the device, the process can also send a vehicle ID 343, so that the wireless device can validate the VCS as an approved system for providing "back-end" validation. In such a manner, it would be difficult to fake either side of the validation process, since each system in the two-part system knows the identity of the other system and requires some validation of the other system's identity before approving the transaction.

Two scenarios are presented below, the first outlining the less complex system of FIG. 2A and the second outlining the more complex system of FIGS. 3A and 3B. In both cases, secure transactions can be established based on the presence of both a known wireless device and vehicle. Further, while all examples presented herein are useful to illustrate examples of possible processes, they are not intended to limit the scope of the invention thereto.

In the first scenario, Bob owns a cellular phone, running a validation application, and a FORD ESCAPE, equipped with a vehicle computing system (such as, but not limited to, the FORD SYNC system). Bob arrives at a gas station and wishes to fuel his vehicle. His phone is capable of BLUETOOTH communication with a fuel pump, and the fuel pump requests account information from the phone.

Before transferring the account information, the phone checks to verify that communication is established with the VCS of the FORD ESCAPE. Once communication has been verified, the phone subsequently checks a received vehicle ID against an ID stored in the phone, or receives other validation information from the VCS. If the validation/comparison matches an expected value, the phone then transfers any needed account/approval information to the fuel pump, for use in purchasing gasoline. In this scenario, anyone else using either Bob's phone or Bob's vehicle, but not both, will not be able to purchase gasoline in this manner, because at least one of the verifications will not match up.

In a second scenario, Mary has similar equipment Bob's. Upon arriving at the fuel pump, Mary's phone also receives a request for information and checks to see if communication with a VCS is established. In addition to requesting verification and/or vehicle ID from the VCS, Mary's phone sends some form of ID to the VCS. The VCS then compares this received ID to a locally stored ID, to ensure that it is actually Mary's phone, and not a false-requestor, asking for validation. Once the identity of the phone is established, the VCS can send back verification and/or a vehicle identifier. Mary's phone can compare the vehicle identifier to a stored vehicle identifier, to ensure that it was actually Mary's vehicle that sent back the verification/ID. Once both systems have mutually ensured validation, any necessary information can be relayed to the merchant system.

Numerous other configurations and communication channels are possible which can achieve a similar result, and are considered to be within the scope of the invention.

FIG. 4A shows an illustrative example of a verification configuration process. This example shows a wireless device first establishing a linkage with a VCS. In this example, an initialization request is sent from the wireless device to the VCS 401. Communication with the VCS is then established 403 and identifying data can be sent from the wireless device to the VCS 405.

Responsive to the sending of identification information, the process may receive vehicle identifying information 407, which can be stored locally 409. Additionally, although not shown, additional verification information relating to a financial account may be input at this point. This could include a password, CID number, PIN, etc. Inputting this information (and validating it, through, for example, communication with an account servicer), can help prevent a party with a stolen phone/vehicle storing previously input financial information from simply establishing a new pairing between an unauthorized system and an authorized one, and then utilizing the stored financial information based on "fake" verification.

FIG. 4B shows an illustrative example of a second verification configuration process. In this example, a VCS receives an initialization request from a wireless device 421. In addition to the request, the VCS receives one or more elements identifying the wireless device 423. The VCS can then store the identification information received from the wireless device 425, and respond to the wireless device with a vehicle ID.

In still another embodiment not shown, one or both devices can store user identification information. At some point in the initialization process, one or both of the systems can require an initializer to verify the stored user information. For example, without limitation, a user name, address and password could be stored on a wireless device. Initialization could then require a user to verify this information using the VCS (or vice versa) so that an improper pairing could not be faked using only one authorized device.

Although this concept has been largely discussed in terms of financial transactions, it is also possible to utilize the dual-identification embodiments to authorize, for example, control of a house system, such as a garage door. Any system that could be controlled by a phone could first require authentication using the vehicle as a secondary source, and this concept is not limited to financial transactions.

Additional possible non-limiting examples of places the device authentication could be used include, but are not limited to, parking garages, home garages, toll booths, gated communities, etc.

In at least one non-limiting example, geographic location may be used to authenticate a user as well. For example, a "standard" area in which a user may be authenticated may be established. This could be based on where a vehicle is housed, common user habits, user defined perimeters, etc. If the attempt for validation is performed outside this area (e.g., if someone took the car and the phone to an uncommon area), validation may be refused, or may require an additional authentication step. This is just one example of an additional safeguard that could be built in.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method comprising:
  receiving a payment-information request at a wireless device (WD);
  determining, by the WD, communication between the WD and a vehicle computing system (VCS);
  based on the determining, sending a wireless device identification from the WD to the VCS;
  receiving, by the WD, a vehicle identification from the VCS;
  verifying, by the WD, a vehicle, using the vehicle identification;
  and
  responsive to the vehicle verification, transmitting, by the WD, requested payment-information.

2. The method of claim 1, wherein the payment-information includes account information.

3. The method of claim 1, wherein the payment-information includes purchase validation information.

4. The method of claim 1, wherein the transmitting requested payment-information further includes transmitting requested payment-information received at the WD from the VCS.

5. A non-transitory computer readable storage medium, storing instructions that, when executed by a processor, cause the processor to perform a method comprising:
  receiving a payment-information request at a wireless device (WD);
  determining, by the WD, communication between the WD and a vehicle computing system (VCS);
  based on the determining, sending a wireless-device identification from the WD to the VCS;
  receiving, by the WD, a vehicle identification from the VCS;
  verifying, by the WD, a vehicle, using the vehicle identification;
  and
  responsive to the vehicle verification, transmitting, by the WD, requested payment-information.

6. The computer readable storage medium of claim 5, wherein the payment-information includes account information.

7. The computer readable storage medium of claim 5, wherein the transmitting requested payment-information further includes transmitting requested payment-information received at the WD from the VCS.

* * * * *